(12) United States Patent
Argil Torres et al.

(10) Patent No.: US 11,144,298 B2
(45) Date of Patent: Oct. 12, 2021

(54) FEATURE INSTALLER FOR SOFTWARE PROGRAMS

(71) Applicant: Microsoft Technology Licensing, LLC, Redmond, WA (US)

(72) Inventors: Jose Julian Argil Torres, Redmond, WA (US); Jiajun Hua, Bellevue, WA (US); Qi Chen, Redmond, WA (US); Alexandru Croicu, Redmond, WA (US); Brenton Michael Moffit, Seattle, WA (US); David Moreno, Redmond, WA (US); Abhishek Kumar Sharma, Bellevue, WA (US); Eray Aydin, Seattle, WA (US); Sudheer Maremanda, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 108 days.

(21) Appl. No.: 16/231,082

(22) Filed: Dec. 21, 2018

(65) Prior Publication Data

US 2020/0019399 A1    Jan. 16, 2020

Related U.S. Application Data

(60) Provisional application No. 62/697,709, filed on Jul. 13, 2018.

(51) Int. Cl.
| | | |
|---|---|---|
| G06F 9/44 | (2018.01) | |
| G06F 8/65 | (2018.01) | |
| G06F 8/61 | (2018.01) | |
| H04L 29/08 | (2006.01) | |
| G06F 9/48 | (2006.01) | |

(52) U.S. Cl.
CPC ............ G06F 8/65 (2013.01); G06F 8/64 (2013.01); G06F 9/4881 (2013.01); H04L 67/2842 (2013.01); H04L 67/34 (2013.01)

(58) Field of Classification Search
CPC . G06F 8/65; G06F 8/64; G06F 9/4881; H04L 67/34; H04L 67/2842
USPC .......................................................... 717/173
See application file for complete search history.

(56) References Cited

U.S. PATENT DOCUMENTS

| | | | |
|---|---|---|---|
| 6,880,010 B1* | 4/2005 | Webb ............... | H04L 67/02 709/227 |
| 6,931,429 B2* | 8/2005 | Gouge ............... | H04L 67/16 709/203 |
| 7,620,948 B1 | 11/2009 | Rowe et al. | |
| 7,913,246 B2 | 3/2011 | Hammond et al. | |

(Continued)

OTHER PUBLICATIONS

Amoeba: A distributed operating system for the 1990s author: SJ Mullender, published on 1990, source: IEEE.*

(Continued)

*Primary Examiner* — Chameli Das
(74) *Attorney, Agent, or Firm* — Schwegman Lundberg & Woessner, P.A.

(57) ABSTRACT

A computer implemented method for updating a host application with an individual feature includes operations for pinging a server via an installer associated with the host application on a client device to obtain information regarding one or more available features, downloading a feature from one or more available features from the server to the client device, and updating, via the installer, the host application with the feature.

16 Claims, 7 Drawing Sheets

(56) References Cited

U.S. PATENT DOCUMENTS

| | | | |
|---|---|---|---|
| 7,987,459 B2 | 7/2011 | Chow et al. | |
| 10,467,022 B2* | 11/2019 | Kumar | G06F 9/44505 |
| 2003/0033517 A1* | 2/2003 | Rutherglen | G06F 16/27 |
| | | | 713/153 |
| 2003/0097433 A1 | 5/2003 | Park et al. | |
| 2006/0069753 A1 | 3/2006 | Hu et al. | |
| 2006/0130046 A1* | 6/2006 | O'Neill | G06F 8/658 |
| | | | 717/168 |
| 2006/0262915 A1* | 11/2006 | Marascio | H04Q 11/0414 |
| | | | 379/201.01 |
| 2008/0301669 A1 | 12/2008 | Rao et al. | |
| 2009/0204422 A1* | 8/2009 | James | G06Q 30/02 |
| | | | 705/2 |
| 2011/0029966 A1* | 2/2011 | Moshir | G06F 11/1433 |
| | | | 717/173 |
| 2012/0185606 A1* | 7/2012 | Mocanu | G06F 1/00 |
| | | | 709/230 |
| 2013/0132599 A1* | 5/2013 | Nakashima | H04L 67/34 |
| | | | 709/230 |
| 2013/0179876 A1* | 7/2013 | Aliminati | H04L 63/0209 |
| | | | 717/177 |
| 2013/0339942 A1 | 12/2013 | Brunsman et al. | |
| 2014/0067918 A1* | 3/2014 | Ishii | H04L 67/06 |
| | | | 709/203 |
| 2016/0196131 A1* | 7/2016 | Searle | H04L 29/06 |
| | | | 717/173 |
| 2017/0039046 A1* | 2/2017 | Henke | G06Q 10/0633 |
| 2017/0116022 A1* | 4/2017 | Khalid | G06F 9/45508 |
| 2017/0302754 A1* | 10/2017 | Busatta | H04L 67/2814 |
| 2018/0129515 A1* | 5/2018 | Kumar | G06F 9/44505 |
| 2018/0211046 A1* | 7/2018 | Muttik | G06F 21/566 |
| 2019/0163458 A1* | 5/2019 | Goodridge | G06F 21/604 |

OTHER PUBLICATIONS

Standalone OPC UA wrapper for industrial monitoring and control systems, author: W Kim, poublished on 2018 source: IEEE.*

Software-driven hardware development, author :M King et al, published on 2015; source: ACM.*

"Configuring an HTTP proxy for Software Updater", Retrieved from <<https://help.f-secure.com/product.html?business/psb-portal/latest/en/task_BF8CCC4B1990420E8E412E4110971389-psb-portal-latest-en>>, Retrieved on: Nov. 27, 2018, 2 Pages.

"International Search Report and Written Opinion Issued in PCT Application No. PCT/US2019/037589", dated Oct. 9, 2019, 11 Pages.

* cited by examiner

FEATURE INSTALLER FOR SOFTWARE PROGRAMS

RELATED APPLICATION

This application claims priority to U.S. Provisional Application Ser. No. 62/697,709 (entitled Feature Installer For Software Programs, filed Jul. 13, 2018) which is incorporated herein by reference.

BACKGROUND

Software programs, such as applications running on client devices may be updated with packages of add-ins and extensions. Some applications use an app management program, such as an app store, running on the client device to accomplish such updates. App stores push update notifications down to users for apps that the user has previously acquired. Explicit user action is required for the updates to occur. The user must have the store app installed and enabled on the device, the user must browse, acquire and install the app, and the user must grant the store app permission to automatically update apps.

Updates for larger applications, such as Microsoft Office, are in the form of packages that contain multiple different add-ins and extensions. When a significant number of add-ins and extensions are made available by one or more developers of the application, the add-ins and extensions are aggregated into a package. The package is then made available for downloading. Some of the add-ins and extensions may have defects, or may need to be revised based on client device user feedback. This can result in the modifications to the add-ins and extensions in the package and the package being made available again. The entire process of aggregating along with potential multiple versions of the package can result in several months delay in providing final versions of the package, and generally slowing innovation and improvement of applications.

SUMMARY

A computer implemented method for updating a host application with an individual feature includes operations for pinging a server via an installer associated with the host application on a client device to obtain information regarding one or more available features, downloading a feature from one or more available features from the server to the client device, and updating, via the installer, the host application with the feature.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Software programs, such as applications running on client devices may be updated with packages of add-ins and extensions. Such add-ins and extensions are referred to as features. The features may provide new functions, improve existing functions, and in some cases, fix existing functions. Providing such features in a timely manner can greatly improve the satisfaction of users of the application on client devices, and can increase the speed of innovation.

In various embodiments, a user device with an application to update, and an associated update installer, pings a server and downloads one or more individual feature updates for the application for installation in the application by the installer. The downloads and installation may occur automatically, without the need for user interaction. The installer may operate on multiple different platforms to download features from the server and update their respective application copies. In further embodiments, packages that include feature updates may be shipped to support customers who have either poor connectivity to a network, or block service calls from applications.

Figure 1:
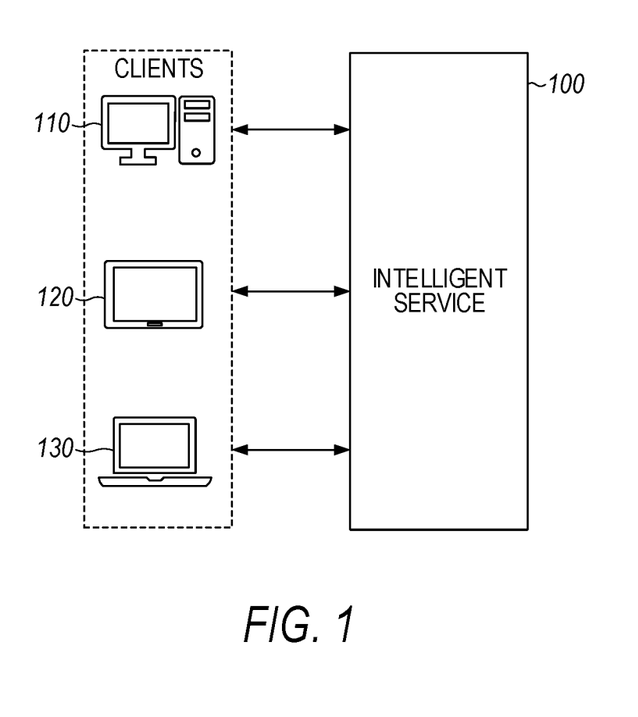
FIG. 1 is a block diagram illustrating an intelligent service for updating applications running on one or more client devices according to an example embodiment.

FIG. 1 is a block diagram illustrating an intelligent service 100 for updating applications running on one or more client devices 110, 120, 130. The client devices may be one or more of laptop computers, cellular phones, touchpad devices, desktop computers, servers, or other device on which applications may run. At a high level the client devices, such as customer/user devices, 110, 120, 130, connect to the intelligent service 100 which may be running on a server or host, to download features to the client devices, such as local machine. An installer, installed on the client devices, is compatible with the various operating systems that an application, such as Microsoft Office, is supported on.

Figure 2:
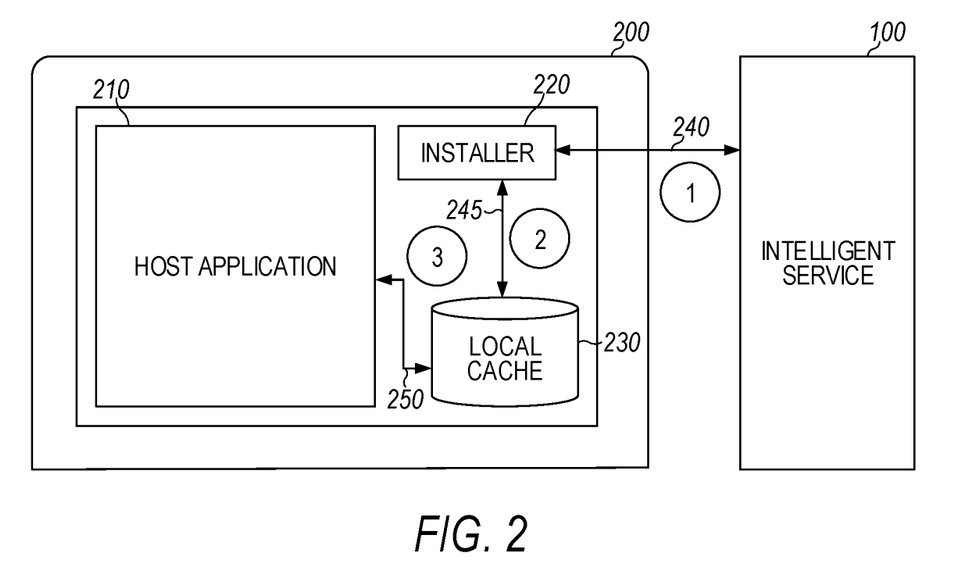
FIG. 2 is a block diagram illustrating details of a client device coupled to the intelligent service according to an example embodiment.

FIG. 2 is a block diagram illustrating details of a client device 200 coupled to the intelligent service 100. The client device 200 has a host application 210 installed thereon. An installer application, installer 220, is installed alongside the host application 210 and downloads or otherwise obtains the features from the intelligent service 100 and installs them on the host application 210. The installer 220 is a separate process from the host application 210 in one embodiment. A local cache 230 is used for temporary storage of downloaded features.

The installer 220 connects to the intelligent service 100 and sends via connection 240 client specific information to the intelligent service 100, such as client device 200 capabilities, client device 200 operating system type and version, and host application 210 version. In some embodiments, the installer 220 will periodically contact the intelligent service 100 to determine if there are features available for downloading or obtain information regarding features available for downloading. Contacting the intelligent service 100 may take the form of a ping-like communication, which includes any type of communication, such as an HTTP request or other communication, all of which may be referred to as pinging, pinging may be done as often as desired, such as every N hours, such as every 4 hours, daily, weekly, monthly, or even multiple times per day to ensure the host application is updated with the newest features and versions of features. In further embodiments, the intelligent service 100 may push feature notifications to the installer 220, allowing the installer to ping the intelligent service 100 or otherwise begin a feature download process. In still further embodiments, service packages with feature updates may be shipped to clients for installation of the features.

The intelligent service 100 compares the sent information with a list of available features for the version of the host application and responds with the list of one or more features that are applicable to the client device via connection 240. The installer 220 then downloads one or more of the features via connection 240 in the background and registers them with the host application 210. After downloading the features, the installer 220 saves the feature or features in the local cache 230 via connection 245, installs the features, and makes them available to the host application 210 via connection 250. The host application 210 accesses the local cache to load the feature or features.

Figure 3:
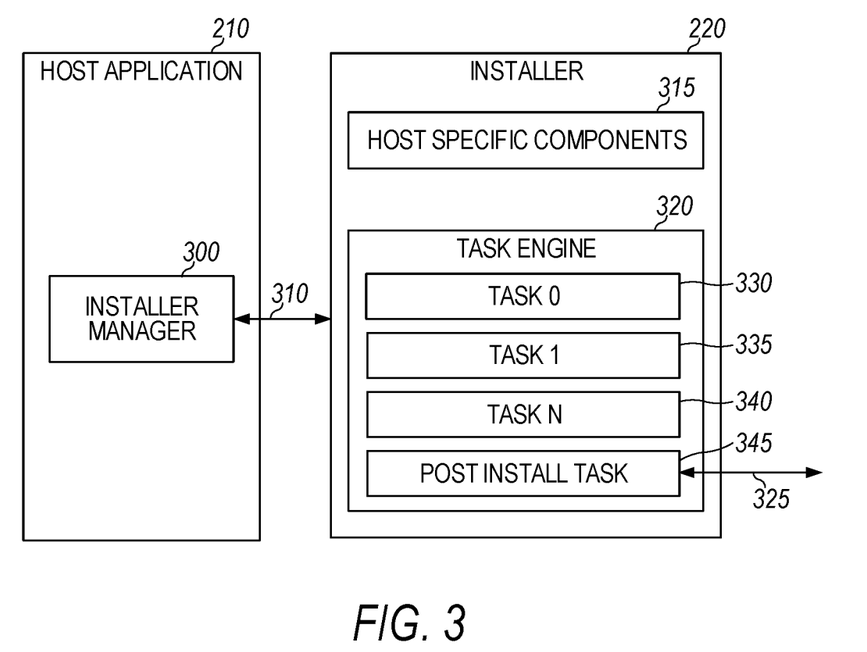
FIG. 3 is a block flow diagram illustrating interaction between the host application and the installer according to an example embodiment.

FIG. 3 is a block flow diagram illustrating interaction between the host application 210 and the installer 220. The host application 210 has an installer manager 300 that is responsible for instantiating and starting an installer process 310. Installer manager 300 is a minimal piece of code that is easily included in the host application and is responsible for handling communication with the installer 220. Communication between the host application 210 and the external installer application 220 may be done using COM or any other suitable communication mechanism. The installer 220 has various host specific components 315 that allow such communication with the host application. A task engine 320 inside the installer 220 allows the installer 220 to perform various actions such as initiate connection with a server running intelligent service 100, send client device 200 information, receive responses from the server, download feature file or package files, install features, clean up after installation, uninstallation, and any custom action that may be required as part of the download/install process 325.

The actions performed by the task engine 320 are shown as an arbitrary number of tasks—task0 330, task1 335, task2 340, and post install task 345. The number of tasks may be more or fewer in further embodiments. The task engine can execute the arbitrary number of tasks in sequence or in parallel.

Figure 4:
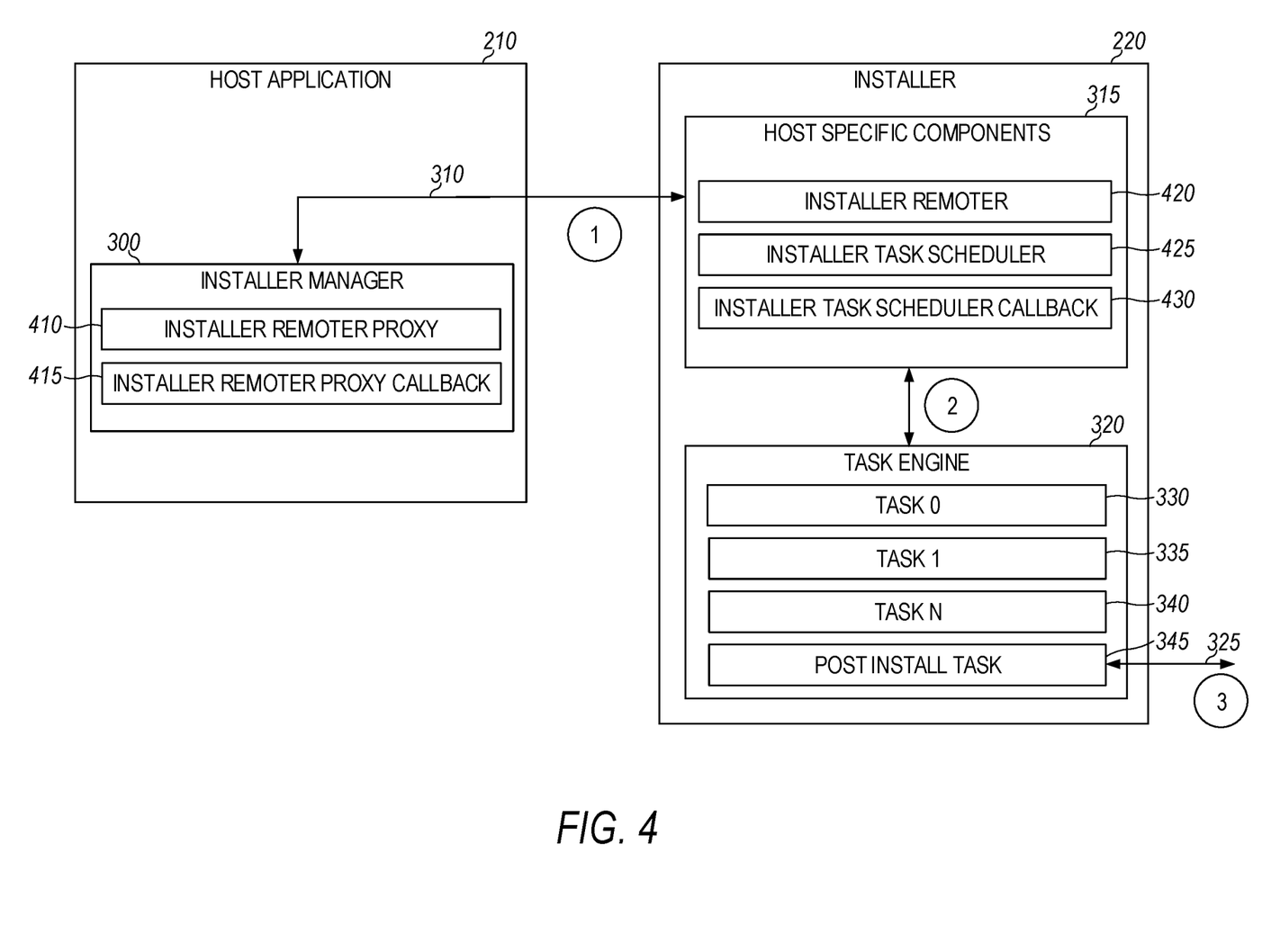
FIG. 4 is a block flow diagram that illustrates further interactions between the host application and the installer according to an example embodiment.

FIG. 4 is a block flow diagram that illustrates further interactions between the host application 210 and the installer 220. In one embodiment, the installer manager 300 includes a proxy 410, shown as InstallerRemoterProxy and a callback proxy 415, shown as InstallerRemoterProxyCallback. The proxy 410 and callback proxy 415 serve as a wrapper or agent object that is for communication between the installer manager 300 and the installer 220 without providing direct access to the installer manager 300 or the host application 210.

The host specific components 315 block is expanded in FIG. 4 to provide a more detailed view of the functions performed. Host specific components 315 include an InstallerRemoter 420, an InstallerTaskScheduler 425, and an InstallerTaskSchedulerCallback 430. InstallerRemoter 420 communicates directly with the proxy 410 to receive information and provide downloads. InstallerTaskScheduler 425 schedules tasks responsive to the InstallerRemoter 420 communications. InstallerTaskSchedulerCallback 430 is an interface the is used to enable communication between the task schedule component and the installer process. InstallerTaskSchedulerCallback 430 used to call back to the host application 210 via callback proxy 415 once the installer 220 has results from a task.

IInstallerRemoterProxy is a public interface (from installer to runtime). The input is an std::vector that internally gets converted to a SAFEARRAY.

```
interface IInstallerRemoterProxy : IUnknown
{
HRESULT Ensure([in] bool fLeanBoot, [in]
RuntimeCallback/RuntimeInstance?);
// Shutdown osfinstaller.exe. This is a PostQuitMessage(0)
call in the remote process.
// Remote process can still have some time to serialize
states or finish high-priority tasks.
HRESULT Shutdown( );
// This is for an Insert or Document Open type scenario
where the installation's priority should be higher than
any other background install. This API assumes that the
task-engine 320 will support interrupting tasks.
HRESULT Install(std::vector<InstallerInstallInfo>
vecInstallInfo, [in] RuntimeCallback/RuntimeInstance?);
// Uninstall triggered from the Office client.
HRESULT Uninstall(std::vector<InstallerInstallInfo>
vecInstallInfo, [in] RuntimeCallback/RuntimeInstance?);
};
```

IInstallerRemoter is the Installer lifecycle management interface. CoCreatable class through Class actory CLSID_InstallerMainShell.

```
interface IInstallerRemoter : IUnknown
{
HRESULT Init(InstallerInitInfo* pInitInfo, [in]
IInstallRemoterProxyCallback* pCallback);
HRESULT Shutdown( );
HRESULT GetProcessId([out, retval] int* pdwProcessId);
};
```

CoClass InstallerMainShell

```
library InstallerMainShellLib
{
importlib("stdole32.tlb");
[uuid(be19f061-c08b-426e-811f-2a1ceb1e80ad)]
coclass InstallerMainShell
{
[default] interface IInstallerRemoter;
interface IInstallerTaskScheduler;
};
};
```

IInstallerTaskScheduler: Installer task scheduler interface. Schedules calls from IInstallerRemoterProxy into the task engine.

```
interface IInstallerTaskScheduler : IUnknown
{
HRESULT GetTaskCount([out, retval] int* pcTaskCount);
HRESULT Install([in] SAFEARRAY(InstallerInstallInfo)
ppsarrInstallInfo, [in] IInstallerRemoterProxyCallback*
pCallback);
HRESULT Uninstall([in] SAFEARRAY(InstallerInstallInfo)
ppsarrInstallInfo, [in] IInstallerRemoterProxyCallback*
pCallback);
```

-continued

```
HRESULT Disable([in] SAFEARRAY(InstallerInstallInfo)
ppsarrInstallInfo, [in] IInstallerRemoterProxyCallback*
pCallback);
};
```

IInstallerCallback

```
interface IInstallerCallback : IUnknown
{
HRESULT OnSuccess([in] InstallerInstallInfo*
pInstallInfo);
HRESULT OnError([in] InstallerInstallInfo* pInstallInfo,
[in] ErrorInfo* pErrorInfo);
};
```

IInstallerRemoterProxyCallback

```
interface IInstallerRemoterProxyCallback : public
IInstallerCallback
{
};
```

IInstallerTaskSchedulerCallback

```
interface IInstallerTaskSchedulerCallback : public
IInstallerCallback
{
};
```

Figure 5:
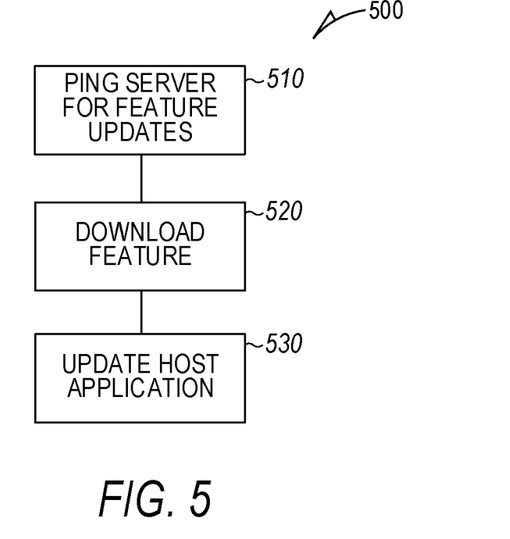
FIG. 5 is a flowchart illustrating a method of making developed features available for individual download and installation by clients according to an example embodiment.

FIG. 5 is a flowchart illustrating a method 500 of making developed features available for individual download and installation by clients. Method 500 in one embodiment is a computer implemented method for updating a host application with an individual feature. At operation 510, an installer associated with the host application on the client device, pings a server to determine if one or more features are available or otherwise obtain information about features that are available. Pinging the server includes sending an HTTP request or any communication agreed upon as a request for available features or information about available features in the event push communications were received regarding the availability of features.

The installer then downloads a feature at 520 from one or more available features from the server to the client device. At operation 530, the installer updates the host application with the feature. The downloaded feature may be locally cached by the installer prior to updating the host application with the feature. The installer may also register the downloaded feature.

In one embodiments, a catalog of available features is received by the installer manager in response to pinging. The installer selects one or more features for downloading at operation 520. The installer communicates with the host application via an installer manager proxy and proxy callback of the host application.

The installer includes host specific components for managing tasks, including one or more of an installer remoter, a task scheduler, and task scheduler call back. The installer further includes a task engine for performing tasks in accordance with the task scheduler and for performing a post install task.

In one embodiment, the installer associated with the application is separate from the application and includes host specific components such that the installer is operable across multiple platforms.

Figure 6:
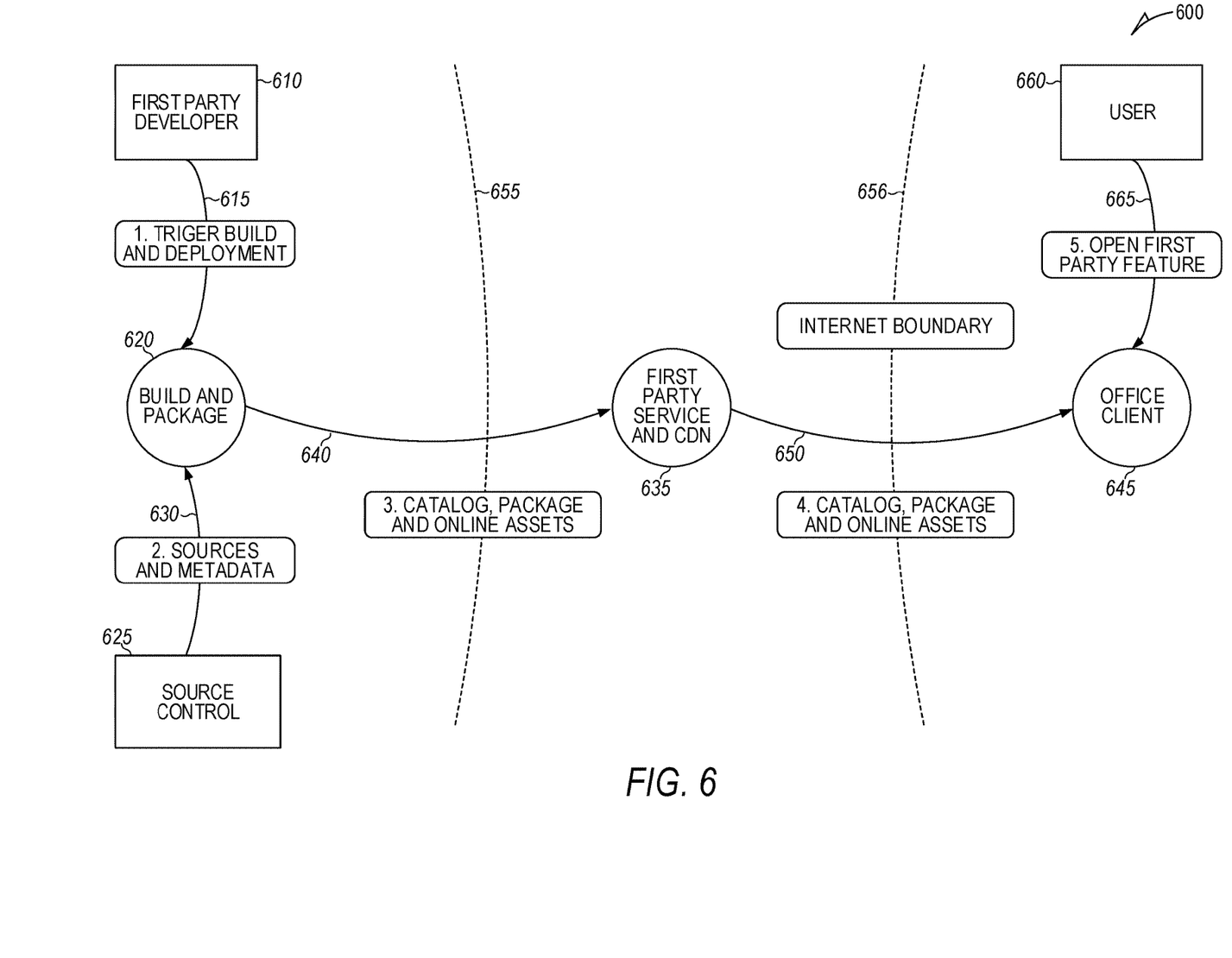
FIG. 6 is a flow diagram illustrating a method of making developed features available for individual download and installation by clients according to an example embodiment.

FIG. 6 is a flow diagram illustrating a method 600 of making developed features available for download and installation by clients. A first party developer 610, such as a developer of a host application or any other developer, may develop one or more features, such as add-ins and extensions to improve the host application. When the feature is complete and ready for updating the host application, the developer 610 triggers at 615 a build and deployment package as indicated at operation 620. Operation 620 obtains the feature from a source control mechanism 625. Source and metadata related to the feature are obtained via connection 630 and are built and packaged at 620. A catalog of available features for the host application is also built.

The package and catalog, as well as other various on-line assets commonly provided for updates to host applications is provided to an intelligent service 635 via a connection 640. In one embodiment, the package includes exactly one feature, providing great granularity in providing feature updates and enhancing the ability to innovate and provide updates at a much faster pace than possible with prior update mechanism. The intelligent service 635 is labeled first party service and content delivery network (CDN). Intelligent service 635 may reside on a network, such as the internet. Internet boundaries are illustrated by broken lines 642 and 643, which separate the first party resources from a host application client 645, labeled Office Client, where Microsoft Office is an example host application to be updated with one or more features via connection 650 to intelligent service 635. The intelligent service 635 may also be provided by a developer other than the original developer of the host application to provide for other party developed features. The client 645 downloads the feature and installs the feature for use by a user 660. User 660 may open the first party feature via connection 665 to the client 545. For features developed by developers other than the developers of the host application, updates may occur automatically provided appropriate consents are obtained.

Figure 7:
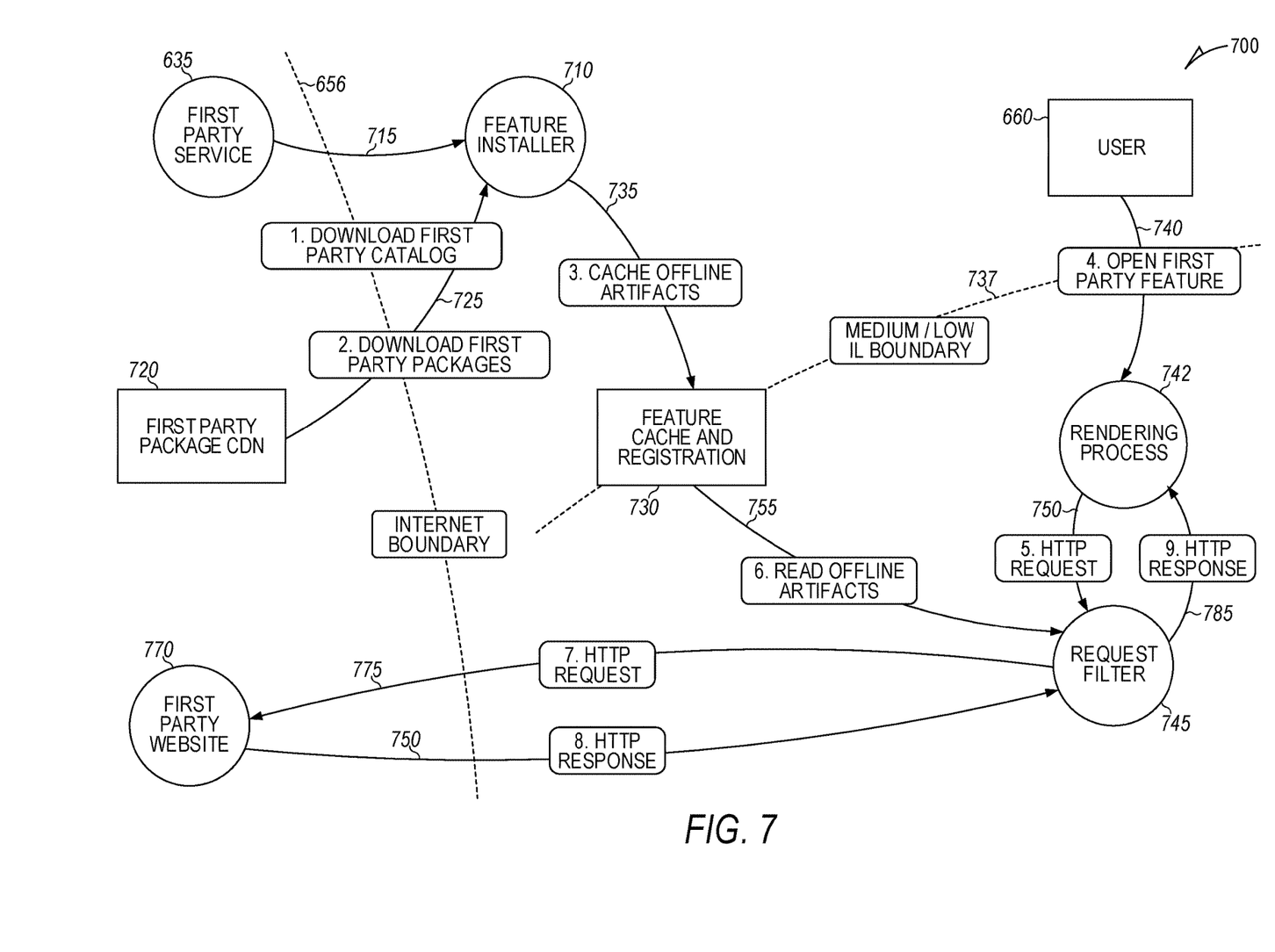
FIG. 7 is a detailed flowchart illustrating a method of communicating feature updates according to an example embodiment.

FIG. 7 is a detailed flowchart illustrating a method 700 of communicating feature updates according to an example embodiment. Method 700 begins with installer 710 downloading, via connection or operation 715, a catalog of updates from the intelligent service, labeled first party service 635. One or more first party packages of features is downloaded from a store of first party packages 720 via connection 725. Note that the first party elements are on one side of internet boundary 656. A feature cache and registration block 730 receives and caches offline artifacts via connection 735. The offline artifacts are stored on the user device in a special folder, such as a user or machine specific folder. A medium/low IL (integrity level) boundary is indicated by broken line 736. The lower the process, the more security restrictions the process may have. A low IL process is expected to have less operating system rights than a medium IL process.

User 660 may then request to open the first party feature via connection 740 to a rendering process 742. Rendering process 742, in response to the request to open the feature, generates an HTTP request to a request filter 745 via connection 750. The request filter 745 reads the offline artifacts via connection 755 from the feature cache and registration block 730. Request filter 745 generates an HTTP Request to a first party website 770 via a connection 775 across the internet boundary 656, and receives an HTTP response via connection 780, which is forwarded via connection 785 to the rendering process 742, providing access to the feature to the user 660.

Figure 8:
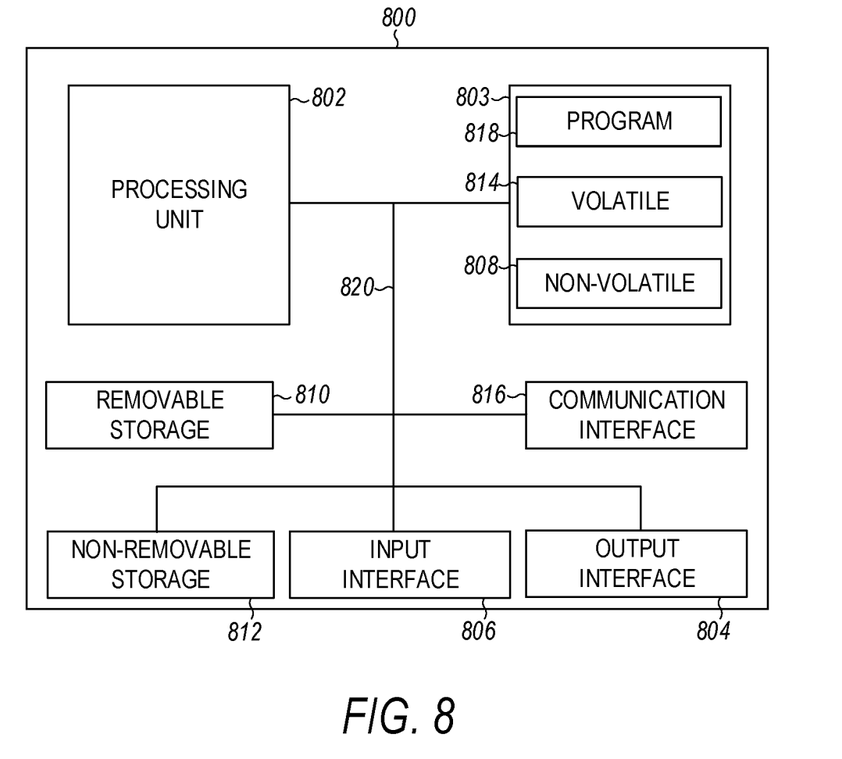
FIG. 8 is a block schematic diagram of a computer system to implement one or more example embodiments.

FIG. 8 is a block schematic diagram of a computer system 800 to implement device and methods for providing updates for host applications for performing methods and algorithms according to example embodiments. All components need not be used in various embodiments.

One example computing device in the form of a computer 800 may include a processing unit 802, memory 803, removable storage 810, and non-removable storage 812. Although the example computing device is illustrated and described as computer 800, the computing device may be in different forms in different embodiments. For example, the computing device may instead be a smartphone, a tablet, smartwatch, smart storage device (SSD), or other computing device including the same or similar elements as illustrated and described with regard to FIG. 8. Devices, such as smartphones, tablets, and smartwatches, are generally collectively referred to as mobile devices or user equipment.

Although the various data storage elements are illustrated as part of the computer 800, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 800 may include or have access to a computing environment that includes input interface 806, output interface 804, and a communication interface 816. Output interface 804 may include a display device, such as a touchscreen, that also may serve as an input device. The input interface 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 800 are connected with a system bus 820.

Computer-readable instructions stored on a computer-readable medium are executable by the processing unit 802 of the computer 800, such as a program 818. The program 818 in some embodiments comprises software to implement one or more of the host application, installer, installer manager, and intelligent service. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 818 along with the workspace manager 822 may be used to cause processing unit 802 to perform one or more methods or algorithms described herein.

EXAMPLES

1. A computer implemented method for updating a host application with an individual feature includes operations including pinging a server via an installer associated with the host application on a client device to obtain information regarding one or more available features, downloading a feature from one or more available features from the server to the client device, and updating, via the installer, the host application with the feature.

2. The computer implemented method of example 1 wherein a catalog of available features is received by the installer manager in response to pinging.

3. The computer implemented method of example 2 wherein the installer communicates with the host application via an installer manager proxy and proxy callback of the host application.

4. The computer implemented method of any of examples 1-3 wherein the installer comprises host specific components for managing tasks.

5. The computer implemented method of example 4 wherein the host specific components include an installer remoter, a task scheduler, and task scheduler call back.

6. The computer implemented method of example 5 wherein the installer further comprises a task engine for performing tasks in accordance with the task scheduler and for performing a post install task.

7. The computer implemented method of any of examples 1-6 wherein the installer associated with the application is separate from the application and includes host specific components such that the installer is operable across multiple platforms.

8. The computer implemented method of any of examples 1-7 wherein pinging the server comprises sending an HTTP request.

9. The computer implemented method of any of examples 1-8 and further comprising caching the downloaded feature prior to updating the host application with the feature.

10. The computer implemented method of any of examples 1-9 and further comprising registering the downloaded feature.

11. A machine-readable storage device has instructions for execution by a processor of a machine to cause the processor to perform operations to perform a method for updating a host application with an individual feature. The operations include pinging a server via an installer associated with the host application on a client device to obtain information regarding one or more available features, downloading a feature from one or more available features from the server to the client device, and updating, via the installer, the host application with the feature.

12. The device of example 11 wherein a catalog of available features is received by the installer manager in response to pinging.

13. The device of example 12 wherein the installer communicates with the host application via an installer manager proxy and proxy callback of the host application.

14. The device of any of examples 11-3 wherein the installer comprises host specific components for managing tasks.

15. The device of example 14 wherein the host specific components include an installer remoter, a task scheduler, and task scheduler call back.

16. The device of example 15 wherein the installer further comprises a task engine for performing tasks in accordance with the task scheduler and for performing a post install task.

17. The device of any of examples 11-16 wherein the installer associated with the application is separate from the application and includes host specific components such that the installer is operable across multiple platforms.

18. The device of any of examples 11-17 wherein pinging the server comprises sending an HTTP request.

19. The device of any of examples 11-18 and further comprising caching the downloaded feature prior to updating the host application with the feature.

20. The device of any of examples 11-19 and further comprising registering the downloaded feature.

21. A device includes a processor and a memory device coupled to the processor and having a program stored thereon for execution by the processor to perform operations of updating a host application with an individual feature. The operations include pinging a server via an installer associated with the host application on a client device to obtain information regarding one or more available features, downloading a feature from one or more available features from the server to the client device, and updating, via the installer, the host application with the feature.

22. The device of example 21 wherein a catalog of available features is received by the installer manager in response to pinging.

23. The device of example 22 wherein the installer communicates with the host application via an installer manager proxy and proxy callback of the host application.

24. The device of any of examples 21-23 wherein the installer comprises host specific components for managing tasks.

25. The device of example 24 wherein the host specific components include an installer remoter, a task scheduler, and task scheduler call back.

26. The device of example 25 wherein the installer further comprises a task engine for performing tasks in accordance with the task scheduler and for performing a post install task.

27. The device of any of examples 21-26 wherein the installer associated with the application is separate from the application and includes host specific components such that the installer is operable across multiple platforms.

28. The device of any of examples 21-17 wherein pinging the server comprises sending an HTTP request.

29. The device of any of examples 21-28 and further comprising caching the downloaded feature prior to updating the host application with the feature.

30. The device of any of examples 21-29 and further comprising registering the downloaded feature.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method for updating a host application with an individual feature includes operations comprising:
   periodically pinging a server with client device specific information including operating system type and version and host application type and version via an installer associated with the host application on a client device to obtain information regarding one or more available features identified as applicable to the client device;
   initiating via the installer, downloading a feature from one or more available features from the server to the client device;
   starting an installer process in response to a communication from a host application installer manager that includes a proxy and callback proxy that serve as a wrapper to prevent direct access to the host application; and
   updating, via the installer, the host application with the feature, the installer including a task engine to execute tasks and execute a post install task.

2. The computer implemented method of claim 1 wherein the obtained information comprises a catalog of available features received by the installer in response to pinging.

3. The computer implemented method of claim 1 wherein the installer comprises host specific components for managing tasks.

4. The computer implemented method of claim 3 wherein the host specific components comprise:
   an installer remoter;
   a task scheduler; and
   task scheduler call back.

5. The computer implemented method of claim 1 wherein the installer associated with the application is separate from the application and includes host specific components such that the installer is operable across multiple platforms.

6. The computer implemented method of claim 1 wherein pinging the server comprises sending an Hyper Text Transfer Protocol (HTTP) request.

7. The computer implemented method of claim 1 and further comprising caching the downloaded feature prior to updating the host application with the feature.

8. The computer implemented method of claim 1 and further comprising registering the downloaded feature.

9. A machine-readable storage device having instructions for execution by a processor of a machine to cause the processor to perform operations to perform a method for updating a host application with an individual feature, the operations comprising:
   periodically pinging a server with client device specific information including operating system type and version and host application type and version via an installer associated with the host application on a client device to obtain information regarding one or more available features identified as applicable to the client device;
   initiating via the installer, downloading a feature from one or more available features from the server to the client device;
   starting an installer process in response to a communication from a host application installer manager that includes a proxy and callback proxy that serve as a wrapper to prevent direct access to the host application; and
   updating, via the installer, the host application with the feature, the installer including a task engine to execute tasks and execute a post install task
   updating, via the installer, the host application with the feature.

10. The machine-readable storage device of claim 9 wherein the obtained information comprises a catalog of available features is received by the installer in response to pinging.

11. The machine-readable storage device of claim 9 wherein the installer comprises host specific components for managing tasks including:
    an installer remoter;
    a task scheduler; and
    task scheduler call back.

12. The machine-readable storage device of claim 9 wherein the installer associated with the application is separate from the application and includes host specific components such that the installer is operable across multiple platforms.

13. The machine-readable storage device of claim 9 and further comprising:
    caching the downloaded feature prior to updating the host application with the feature; and
    registering the downloaded feature.

14. A device comprising:
    a processor; and
    a memory device coupled to the processor and having a program stored thereon for execution by the processor to perform operations to update a host application with an individual feature, the operations comprising:
    periodically pinging a server with client device specific information including operating system type and version and host application type and version via an installer associated with the host application on a client device to obtain information regarding one or more available features identified as applicable to the client device;
    initiating via the installer, downloading a feature from one or more available features from the server to the client device;
    starting an installer process in response to a communication from a host application installer manager that includes a proxy and callback proxy that serve as a wrapper to prevent direct access to the host application; and
    updating, via the installer, the host application with the feature, the installer including a task engine to execute tasks and execute a post install task
    updating, via the installer, the host application with the feature.

15. The device of claim 14 wherein the installer comprises host specific components for managing tasks including:
    an installer remoter;
    a task scheduler;
    task scheduler call back; and
    a task engine for performing tasks in accordance with the task scheduler and for performing a post install task.

16. The device of claim 14 wherein the installer associated with the application is separate from the application and includes host specific components such that the installer is operable across multiple platforms, and wherein the operations further comprise:
    caching the downloaded feature prior to updating the host application with the feature; and
    registering the downloaded feature.

* * * * *